United States Patent
Fujiwara et al.

(10) Patent No.: US 9,457,769 B2
(45) Date of Patent: Oct. 4, 2016

(54) WIPER BLADE

(75) Inventors: Masaru Fujiwara, Kiryu (JP); Kenichi Imoto, Kiryu (JP); Ryu Ikezawa, Kiryu (JP); Hiroyuki Sase, Wako (JP); Kouji Okabe, Wako (JP); Hisaaki Naruse, Wako (JP); Hiroyuki Ikeno, Wako (JP); Akira Takayama, Wako (JP); Naomi Sase, legal representative, Utsunomiya (JP)

(73) Assignees: Mitsuba Corporation, Gunma (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/985,595
(22) PCT Filed: Nov. 30, 2011
(86) PCT No.: PCT/JP2011/077666
§ 371 (c)(1),
(2), (4) Date: Jun. 9, 2014
(87) PCT Pub. No.: WO2012/114596
PCT Pub. Date: Aug. 30, 2012

(65) Prior Publication Data
US 2015/0000067 A1    Jan. 1, 2015

(30) Foreign Application Priority Data
Feb. 23, 2011 (JP) .................... 2011-036721

(51) Int. Cl.
*B60S 1/38* (2006.01)
(52) U.S. Cl.
CPC .............. *B60S 1/3881* (2013.01); *B60S 1/381* (2013.01); *B60S 1/3894* (2013.01); *B60S 1/387* (2013.01); *B60S 1/3886* (2013.01); *B60S 1/3887* (2013.01); *B60S 1/3889* (2013.01)

(58) Field of Classification Search
CPC .... B60S 1/387; B60S 1/3808; B60S 1/3886; B60S 1/3887; B60S 1/3889; B60S 1/381; B60S 1/3881

USPC .......... 15/250.001, 250.32, 250.43
See application file for complete search history.

(56) References Cited

U.S. PATENT DOCUMENTS

| 6,581,237 | B1 | 6/2003 | Kotlarski |
| 6,675,434 | B1 | 1/2004 | Wilhelm et al. |

(Continued)

FOREIGN PATENT DOCUMENTS

| JP | 2002521270 A | 7/2002 |
| JP | 2003503275 A | 1/2003 |

(Continued)

OTHER PUBLICATIONS

International Search Report of PCT Serial No. PCT/JP2011/077666 dated Feb. 8, 2012.

(Continued)

*Primary Examiner* — Michael Jennings
(74) *Attorney, Agent, or Firm* — McCormick, Paulding & Huber LLP

(57) ABSTRACT

A fin part (21e) is provided on a side opposite to a wiping surface side of a rubber holder (21) to press a blade rubber (22) toward the wiping surface side by receiving a wind (W) flowing along a moving car, and covering parts (23) protrude from both lengthwise ends of the blade rubber (22) toward the wiping surface side so as to partially cover lateral parts of the blade rubber (22). Owing to the fin part (21e), liftoff of a wiper blade (20) can be prevented. A wind (W) flowing from the front side to the rear side at an end part of a swing center side of the blade rubber (22) can be rectified by the covering part (23), and the wind (W) can flow along the rear side of the wiper blade (20) in the length direction of the wiper blade (20).

6 Claims, 11 Drawing Sheets

(56) References Cited

U.S. PATENT DOCUMENTS

| | | | | |
|---|---|---|---|---|
| 7,587,783 B1* | 9/2009 | Lin | ................ | B60S 1/3858 |
| | | | | 15/250.201 |
| 7,721,382 B2* | 5/2010 | Malone | ................ | 15/250.07 |
| 7,827,652 B2* | 11/2010 | Yang | ................ | B60S 1/381 |
| | | | | 15/250.201 |
| 8,028,368 B2* | 10/2011 | Chien | ................ | B60S 1/381 |
| | | | | 15/250.201 |
| 8,042,218 B2* | 10/2011 | Moll | ................ | B60S 1/3856 |
| | | | | 15/250.001 |
| 8,595,890 B2* | 12/2013 | Boland | ................ | 15/250.48 |
| 2006/0107485 A1 | 5/2006 | Kim | | |
| 2007/0214593 A1* | 9/2007 | Boland | ................ | 15/250.23 |
| 2008/0028565 A1* | 2/2008 | Thienard | ................ | 15/250.201 |
| 2008/0222832 A1* | 9/2008 | Huang | ................ | B60S 1/3806 |
| | | | | 15/250.43 |
| 2008/0222833 A1* | 9/2008 | Henin | ................ | B60S 1/38 |
| | | | | 15/250.201 |
| 2008/0256740 A1* | 10/2008 | Moll et al. | ................ | 15/250.201 |
| 2009/0151111 A1* | 6/2009 | Chang | ................ | B60S 1/3881 |
| | | | | 15/250.351 |
| 2009/0172910 A1* | 7/2009 | De Block | ................ | B60S 1/38 |
| | | | | 15/250.361 |
| 2010/0107353 A1* | 5/2010 | Boland | ................ | B60S 1/3896 |
| | | | | 15/250.32 |
| 2010/0139026 A1* | 6/2010 | Ku | ................ | B60S 1/381 |
| | | | | 15/250.201 |
| 2010/0180395 A1* | 7/2010 | Aznag | ................ | 15/250.31 |
| 2010/0242204 A1* | 9/2010 | Chien | ................ | B60S 1/381 |
| | | | | 15/250.201 |
| 2010/0319154 A1* | 12/2010 | Bousset | ................ | B60S 1/3889 |
| | | | | 15/250.48 |
| 2011/0047740 A1* | 3/2011 | Weber | ................ | 15/250.32 |
| 2011/0277264 A1* | 11/2011 | Ehde | ................ | B60S 1/3863 |
| | | | | 15/250.32 |

FOREIGN PATENT DOCUMENTS

| | | |
|---|---|---|
| JP | 3107550 U | 12/2004 |
| JP | 2007176459 A | 7/2007 |
| JP | 2009113737 A | 5/2009 |

OTHER PUBLICATIONS

Chinese Office Action and English Translation for Chinese Application Serial No. 201180066045.3 dated Feb. 28, 2015.

* cited by examiner

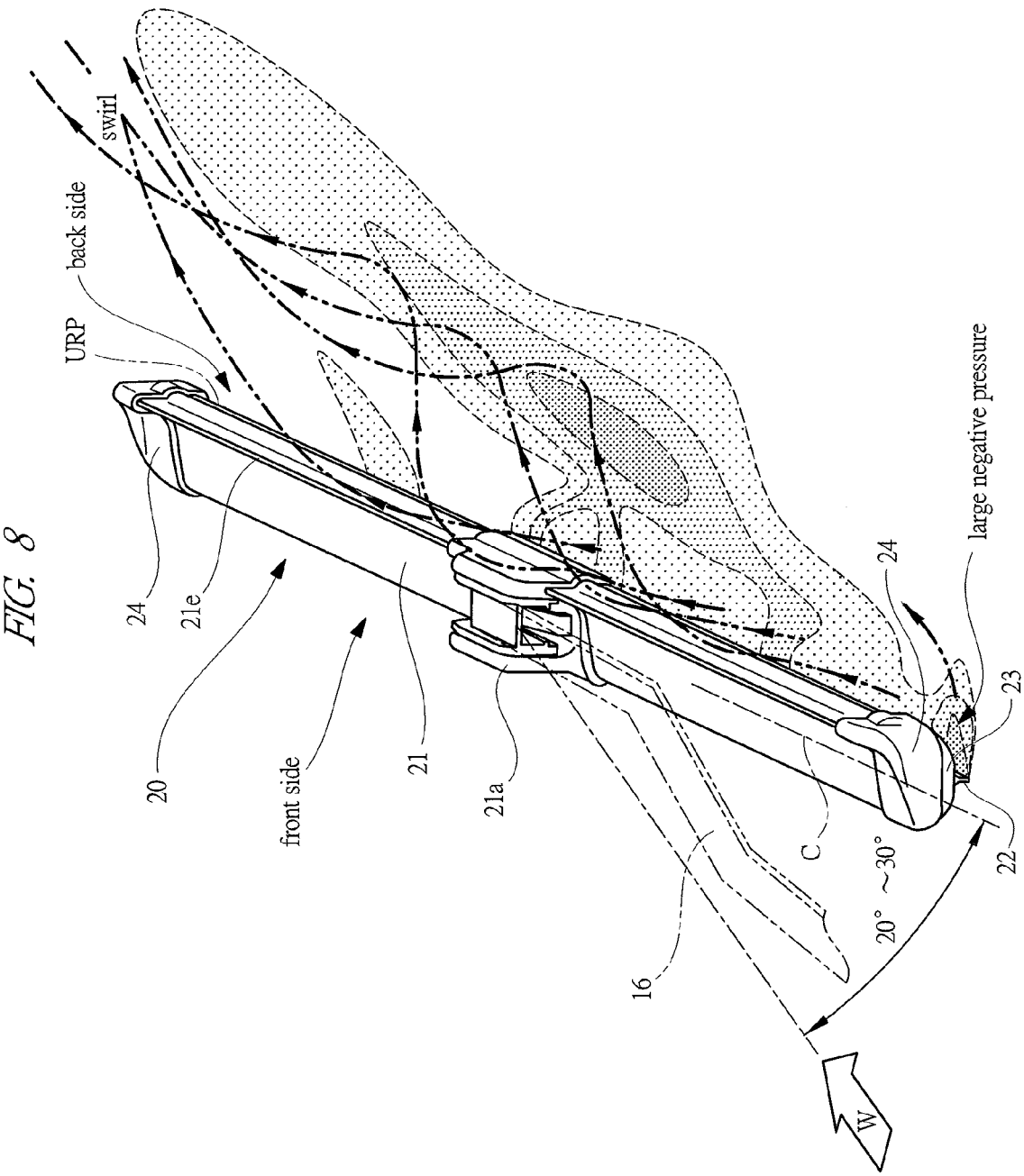

WIPER BLADE

CROSS-REFERENCE TO RELATED APPLICATION

This application is entitled to the benefit of and incorporates by reference subject matter in its entirety disclosed in International Patent Application No. PCT/JP2011/077666 filed on Nov. 30, 2011 and Japanese Patent Application No. JP2011-036721 filed on Feb. 23, 2011.

TECHNICAL FIELD OF THE INVENTION

The present invention relates to a wiper blade provided in a distal-end side of an arm subjected to swinging drive by a drive source and wiping a wipe surface.

BACKGROUND OF THE INVENTION

Conventionally, a wiper device wiping off excrescences such as rainwater and dust on a wipe surface of a windshield is equipped with a vehicle such as an automobile and ensures the range of view of a driver. The wiper device is provided with: a wiper motor (drive source), a wiper arm (arm) subjected to swinging drive via a link mechanism, and a wiper blade wiping the wipe surface. The wiper blade is set up in a distal-end side of the wiper arm and provided with a blade rubber in sliding contact with the wipe surface, and a rubber holder retaining the blade rubber. When a wiper switch inside the vehicle is operated to subject the wiper motor to rotary drive, the wiper arm is subjected to swinging drive via the link mechanism. As a result, the wiper blade operates reciprocating wiping on the windshield and wipes off the excrescences onto the wipe surface.

A wiper device mounted in a vehicle is provided at a front-end part of the windshield, and the wiper blade is disposed outside the vehicle. Therefore, the wiper blade receives travel winds during travelling of the vehicle. Particularly, if the vehicle travels at high speed, lifting force lifting up the wiper blade from the windshield is generated, and a problem that the wiping performance of the wiper blade is reduced is generated. Therefore, wiper blades with various shapes have been developed to suppress the lifting force acting on the wiper blade, (for example, Japanese Utility Model No. 3107550 and JP Publication No. 2007-176459).

The wiper blade described in Japanese Utility Model No. 3107550 or JP Publication No. 2007-176459 has a fin part provided with an inclined surface along the longitudinal direction of the blade rubber. If travel winds are received from the inclined-surface side (front-surface side) of the fin part, for example, when the vehicle travels at high speed, downforce pressing the blade rubber toward the wipe surface is generated. Uplift of the blade rubber from the windshield is suppressed by the generation of the downforce, and then the wiping performance of the wiper blade is improved.

However, according to the wiper blades described in Japanese Utility Model No. 3107550 and JP Publication No. 2007-176459, in the back-surface side of the wiper blade, the separated distance between the travel wind and the wipe surface is longer compared with that in the front-surface side of the wiper blade to provide the fin part generating downforce. Therefore, when the travel winds flow along the inclined surface of the fin part from the front-surface side of the wiper blade toward the back-surface side, comparatively-large swirls (negative pressures) are generated in the back-surface side of the wiper blade. Particularly, when the swinging direction of the wiper blade to the windshield is switched from an upper reversing position to a lower reversing position, the swirls cause a problem (water draw-in phenomenon) that the rainwater, etc. wiped off until the wiper blade reaches the upper reversing position from the lower reversing position are drawn into the wiping range of the wind shield.

SUMMARY OF THE INVENTION

It is an object of the present invention to provide a wiper blade capable of suppressing occurrence of the water draw-in phenomenon caused by negative pressures while suppressing uplift of the wiper blade.

A wiper blade of the present invention is provided in a distal-end side of an arm subjected to swinging drive by a drive source and wipes a wipe surface, comprising: a holder turnably attached to the distal-end part of the arm; a blade attached to the holder along a longitudinal direction of the holder and sliding contact with the wipe surface; a fin part provided in an opposite side to the wipe-surface of at least either one of the holder and the blade, and pressing the blade toward the wipe surface by receiving a wind from a direction along the wipe surface; and a cover member provided at least in a swing center side of both-end parts in longitudinal-direction of the blade, and partially covering a lateral part of the blade by projecting to the wipe-surface side.

In the wiper blade of the present invention, a projection height of the cover member is a projection height covering other part except at least a lip part of the blade.

In the wiper blade of the present invention, a tilting allowing gap allowing tilting of a lip part of the blade is provided between the cover member and the blade.

In the wiper blade of the present invention, wherein a tapered part allowing tilting of the wiper blade is provided in an opposite side of the blade side in the direction along the wipe surface of the cover member.

In the wiper blade of the present invention, wherein a cap is provided at an end part of the blade, and the cover member is integrally provided with the cap.

In the wiper blade of the present invention, wherein the cap is formed of different material from the material of the cover member.

According to the wiper blade of the present invention, the fin part receiving the winds from the direction along the wipe surface and pressing the blade toward the wipe surface is provided in the side opposite to the wipe-surface side of at least either one of the holder and the blade. The cover member projecting to the wipe-surface side and partially covering the lateral part of the blade is provided at least in the swing center side of the blade among the longitudinal-direction both-end parts of the blade. Therefore, uplift of the wiper blade can be suppressed by the fin part. Moreover, the flows of the winds flowing from the front-surface side to the back-surface side at the end part in the swing center side of the blade can be regulated by the cover member, and the winds can be caused to flow along the longitudinal direction in the back-surface side of the wiper blade. Therefore, the swirls generated in the back-surface side of the wiper blade can be reduced to suppress occurrence of the water draw-in phenomenon, and it can be wiped well without leaving rainwater, etc. on the wipe surface.

According to the wiper blade of the present invention, the projection height of the cover member is the height covering the part excluding at least the lip part of the blade. Therefore, the cover member can be close to the wipe surface without contacting the wipe surface, the flow regulating effect by the cover member can be more improved, and occurrence of the water draw-in phenomenon can be suppressed more.

According to the wiper blade of the present invention, the tilting allowing gap allowing tilting of the lip part of the blade is provided between the cover member and the blade. Therefore, during wiping the wiper blade, the lip part of the blade can be precisely tilted, and occurrence of wiping unevenness, etc. (reduction in wiping performance) can be suppressed.

According to the wiper blade of the present invention, the tapered part allowing tilting of the wiper blade is provided in the side opposite to the blade side in the direction along the wipe surface of the cover member. Therefore, if the wiper blade is tilted during wiping the wiper blade, the cover member can be prevented from contacting the wipe surface, and occurrence of wiping unevenness, etc. (reduction in wiping performance) can be suppressed.

According to the wiper blade of the present invention, the cap is provided at the end part of the blade, and the cover member is integrally provided with the cap. Therefore, the end part of the blade can be prevented from being exposed to outside, and the appearance of the wiper blade can be improved.

According to the wiper blade of the present invention, the cap is formed of a different material from a material of the cover member. Therefore, for example, the cap can be formed of a hard plastic, and the cover member can be formed of rubber with flexibility.

BRIEF DESCRIPTIONS OF THE DRAWINGS

FIG. 8 is an analysis figure explaining the occurrence of a negative pressure in the wiper blade of FIG. 1.

DESCRIPTIONS OF THE PREFERRED EMBODIMENTS

The embodiments of the present invention are described with attached figures in detail.

Figure 1:
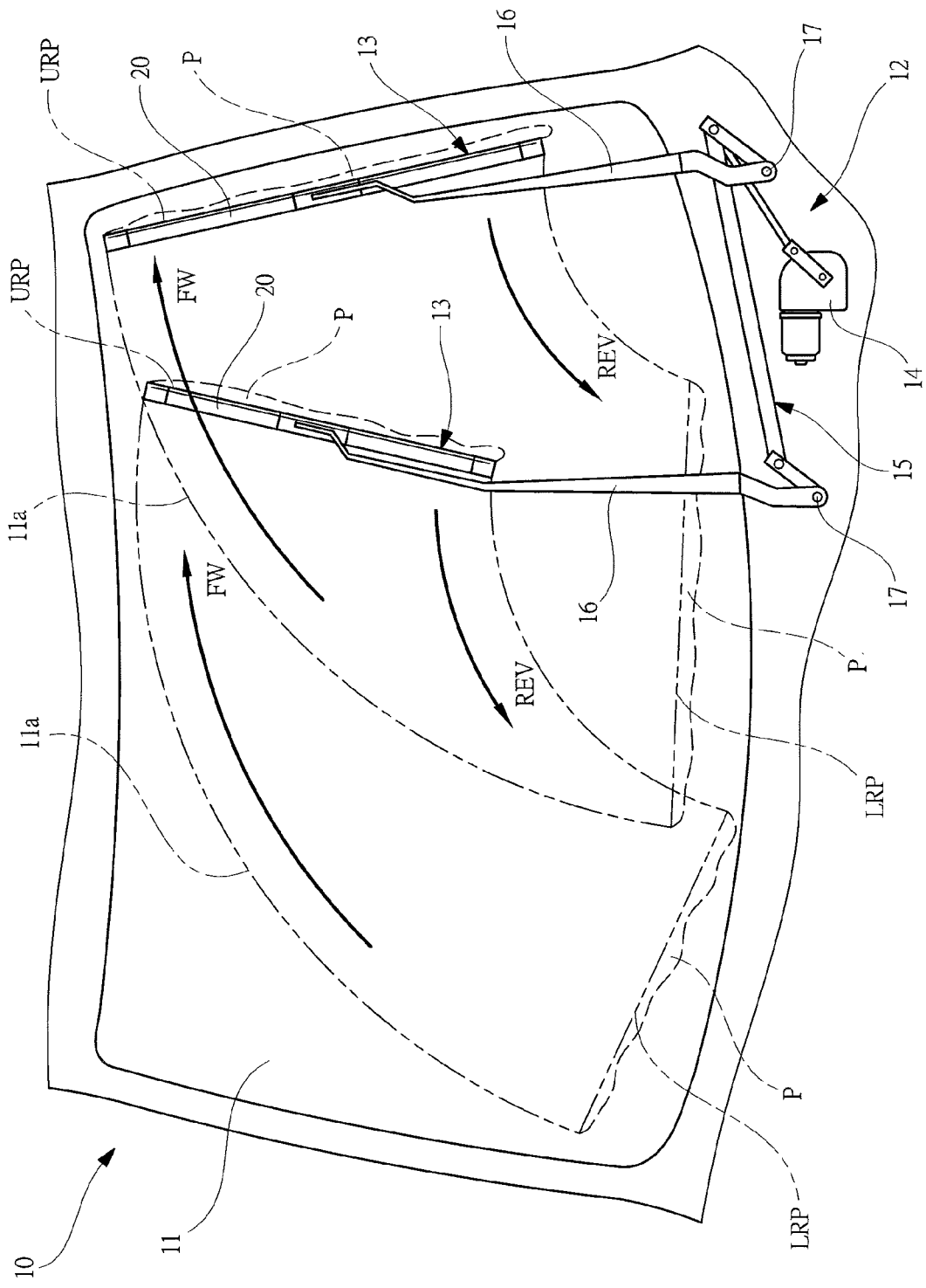
FIG. 1 is an explanatory drawing explaining a wiper device providing a wiper blade of the present invention.
Figure 2:
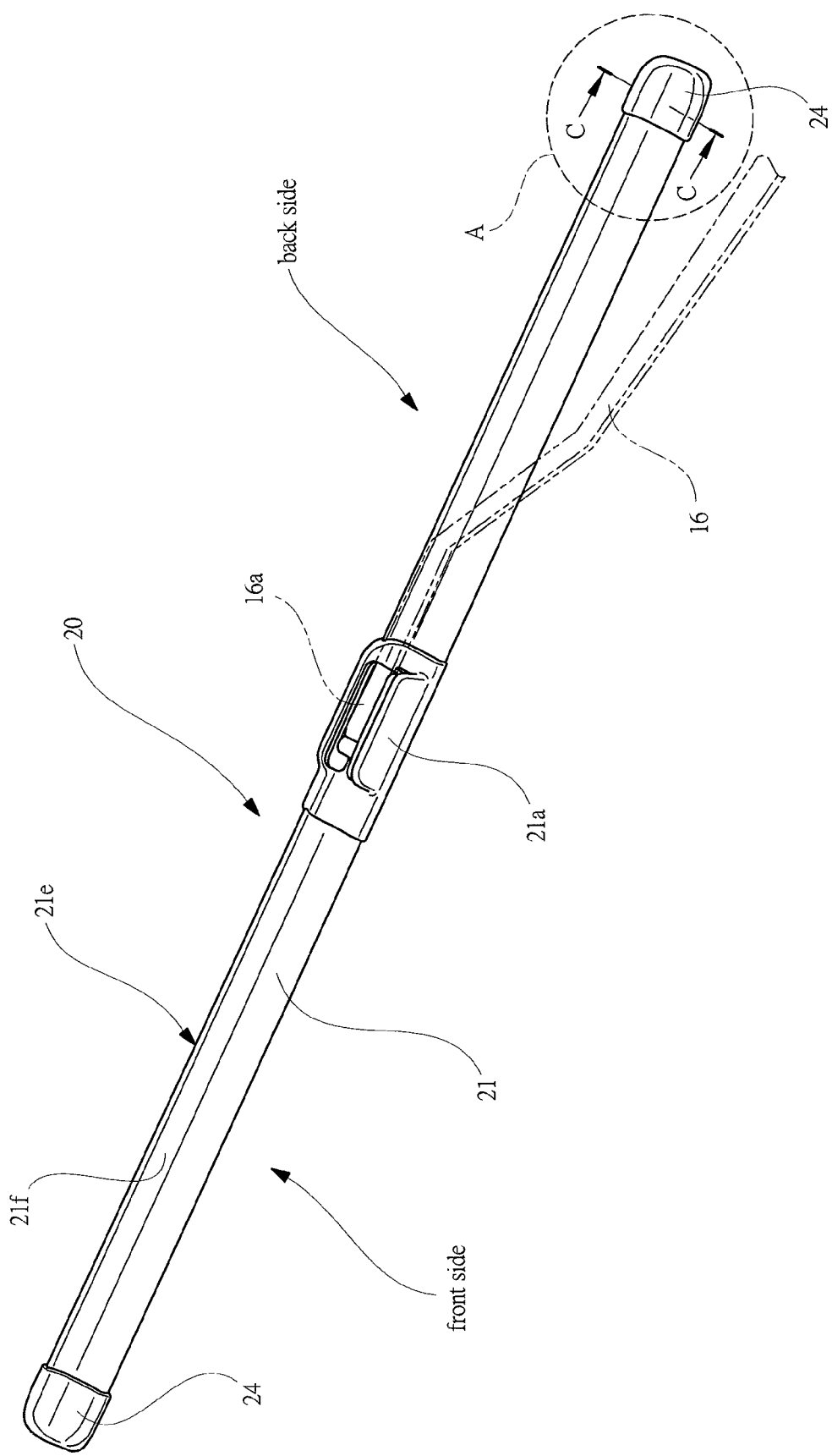
FIG. 2 is a perspective view from a surface side of a wiper blade of FIG. 1.

FIG. 1 is an explanatory drawing explaining a wiper device providing a wiper blade of the present invention. FIG. 2 is a perspective view from a surface side of a wiper blade of FIG. 1.

Figure 3:
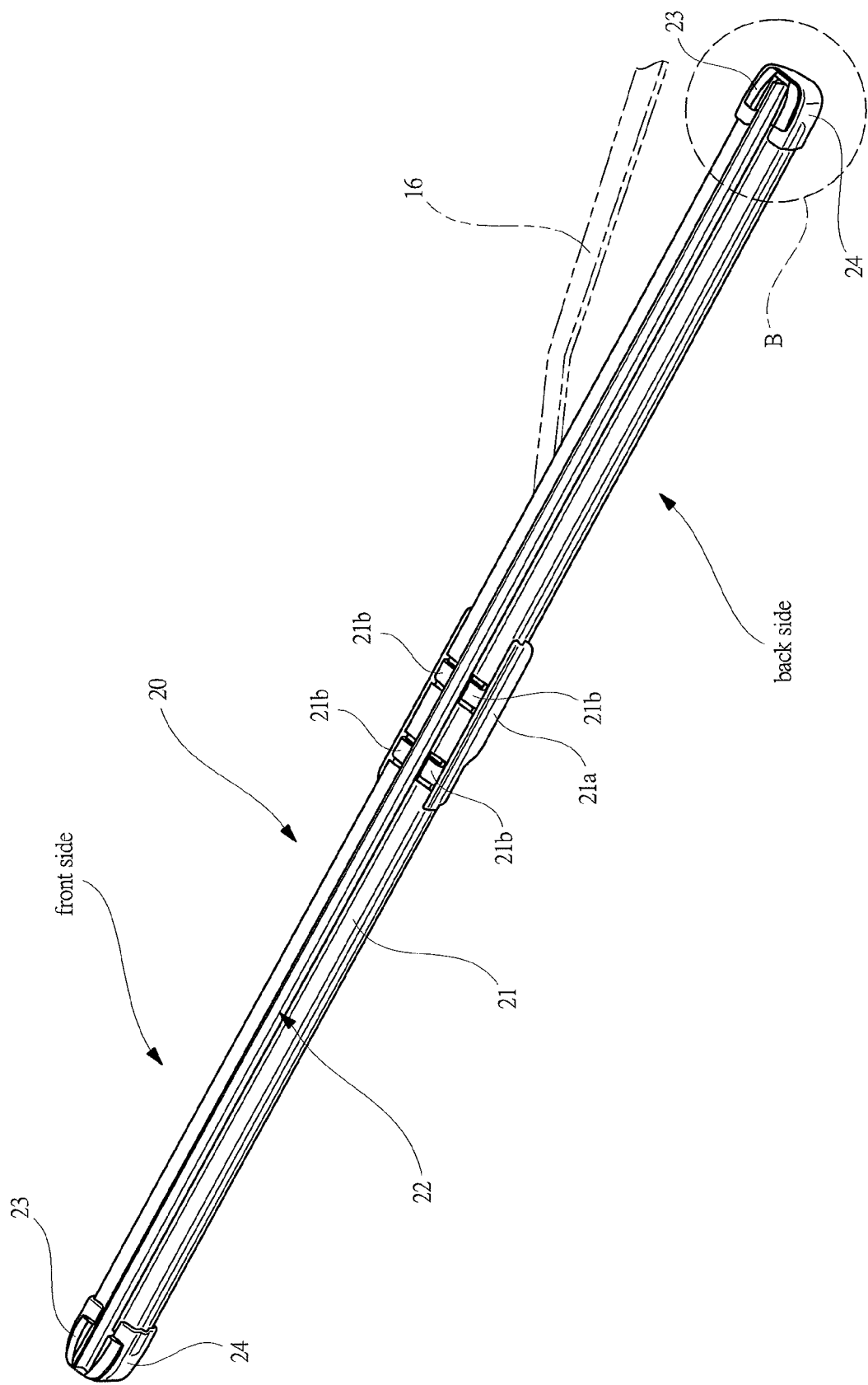
FIG. 3 is a perspective view from a backside of a wiper blade of FIG. 1.
Figure 4:
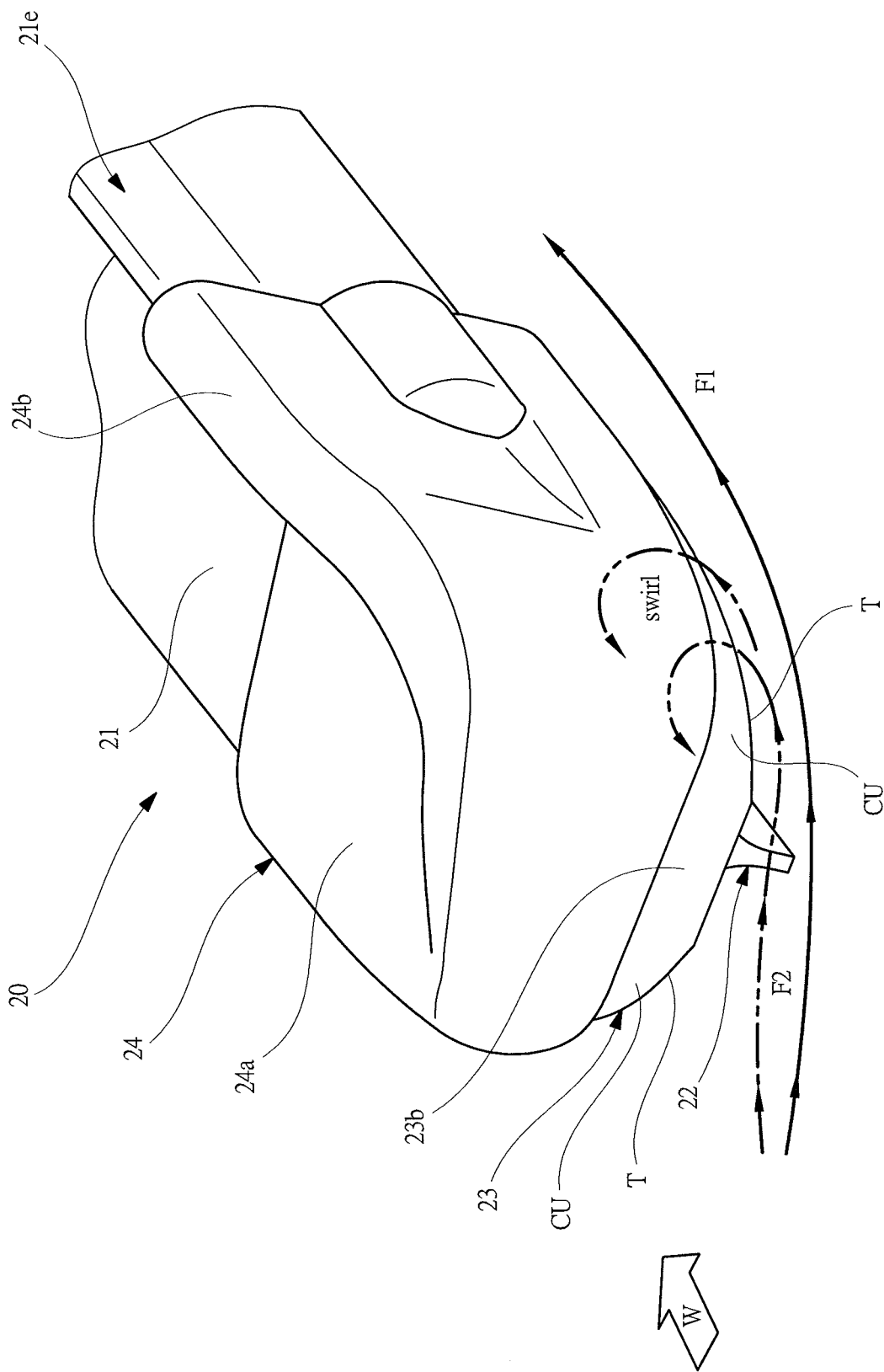
FIG. 4 is an enlarged view of the perspective view of on the part of a broken-line circle A of FIG. 2.
Figure 5:
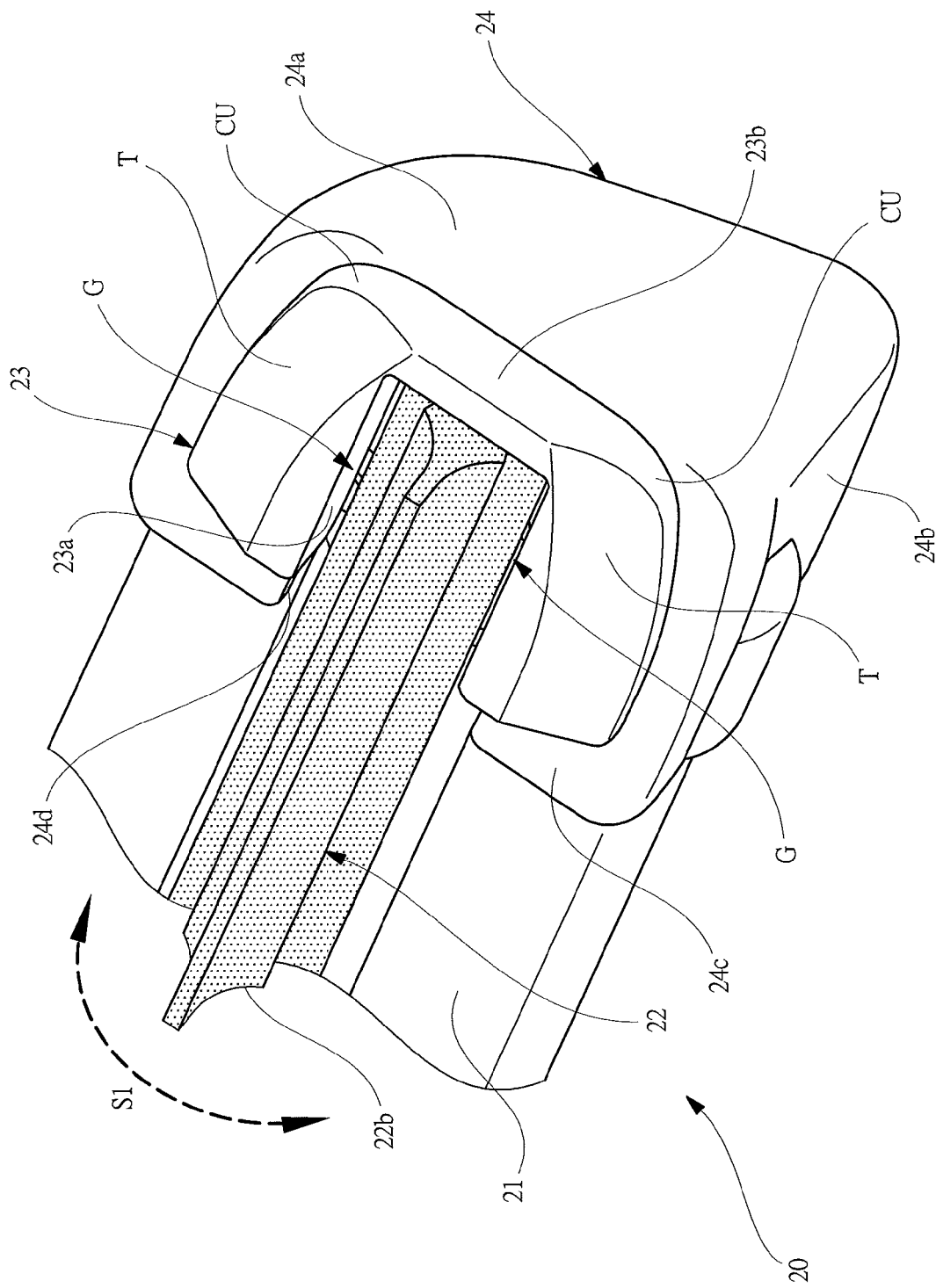
FIG. 5 is of an enlarged view of the perspective view of on the part of a broken-line circle B of FIG. 3.
Figure 6:
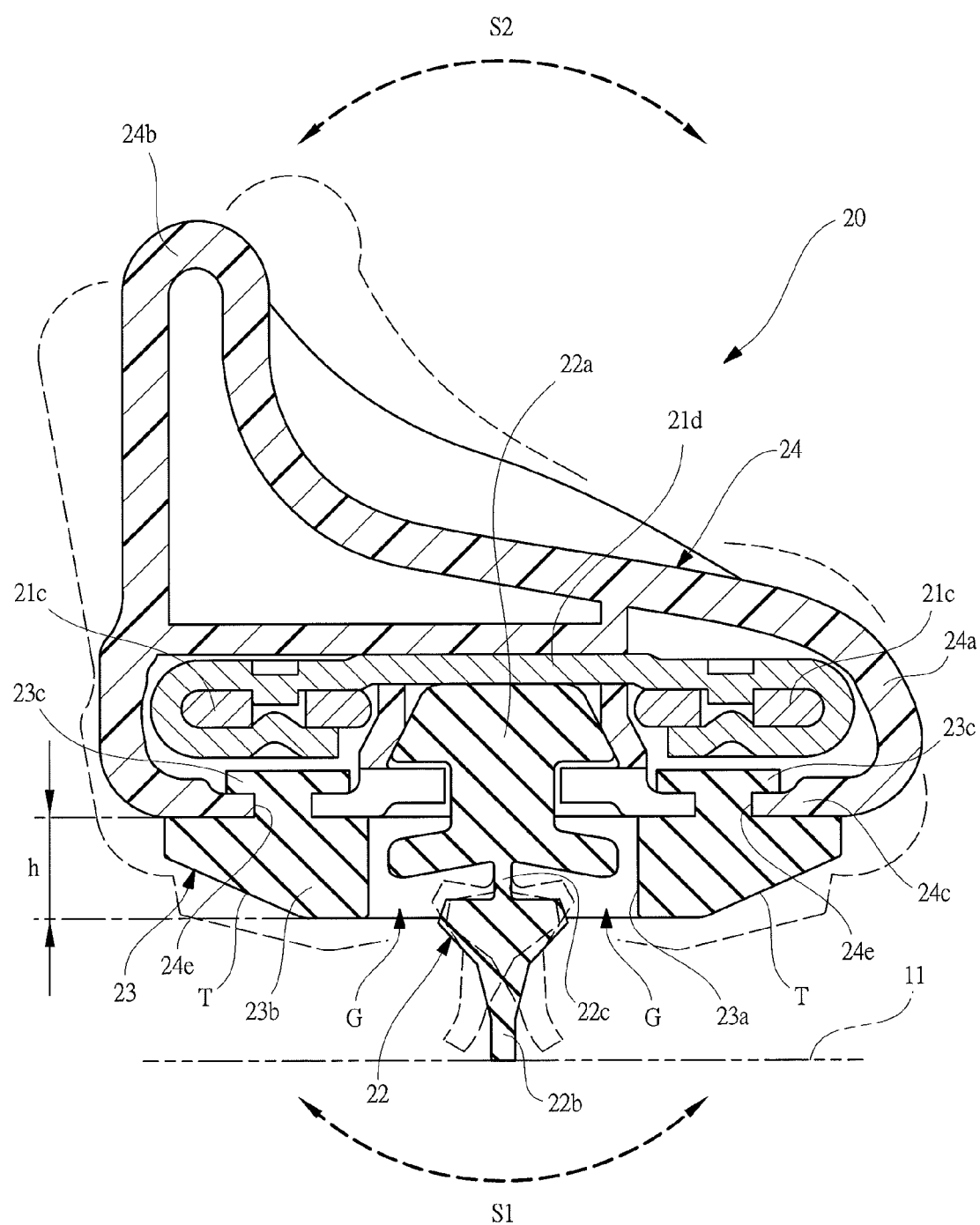
FIG. 6 is a cross sectional view taken along the line C-C of FIG. 2.
Figure 7A:
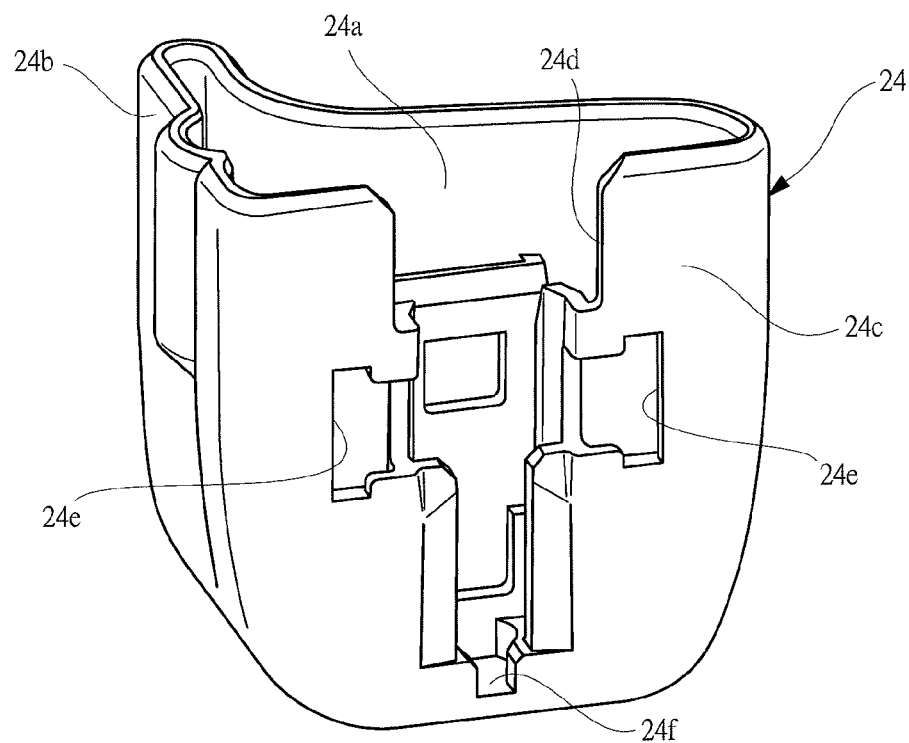
FIG. 7a is a perspective view showing a detailed structure of a cap.
Figure 7B:
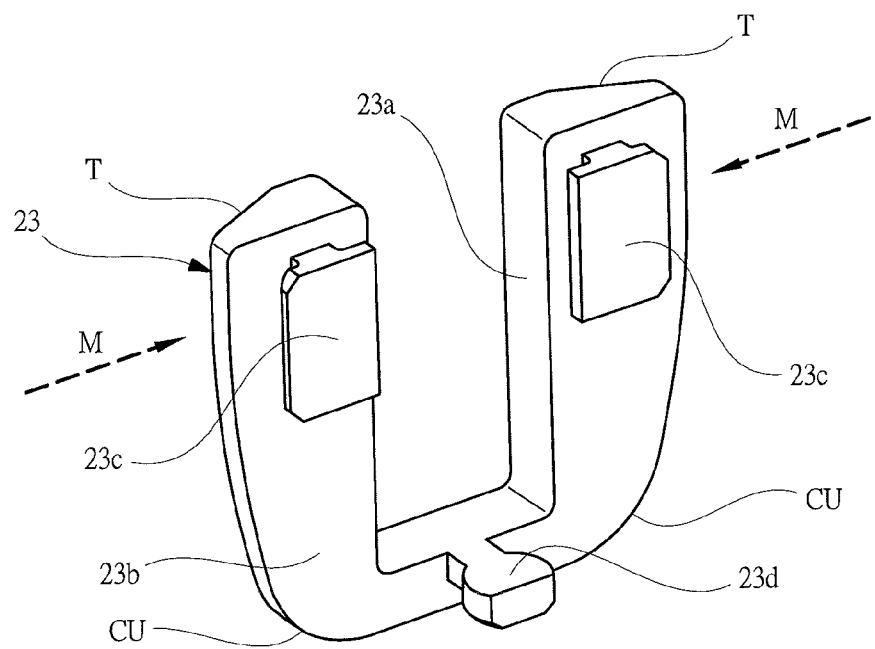
FIG. 7b is a perspective view showing a detailed structure of a covering number.

FIG. 3 is a perspective view from a backside of a wiper blade of FIG. 1. FIG. 4 is an enlarged view of the perspective view of on the part of a broken-line circle A of FIG. 2. FIG. 5 is of an enlarged view of the perspective view of on the part of a broken-line circle B of FIG. 3. FIG. 6 is a cross sectional view taken along the line C-C of FIG. 2. FIG. 7a is a perspective view showing a detailed structure of a cap. FIG. 7b is a perspective view showing a detailed structure of a covering number. FIG. 8 is an analysis figure explaining the occurrence of a negative pressure in the wiper blade of FIG. 1.

As shown in FIG. 1, a front glass 11 as a windshield is provided in a front side of a vehicle 10 such as an automobile, and a wiper device 12 wiping off rainwater, dust, etc. (excrescences) attached onto a wipe surface of the front glass 11, is mounted in a front-end part of the front glass 11 of the vehicle 10. The wiper device 12 is provided with wiper members 13 forming a pair with the member in a driver-seat side and the member in a front passenger-seat side, and is further provided with one wiper motor (drive source) 14. A link mechanism 15 converting the rotary motion of the wiper motor 14 to the swinging motion of the wiper members 13, is provided between the wiper members 13 and the wiper motor 14.

Each of the wiper members 13 is provided with a wiper blade 20 and a wiper arm (arm) 16, and the base-end part of each of the wiper arms 16 is fixed to each pivot shaft 17 turnably provided on the vehicle 10. A substantially center part along a longitudinal direction of each of the wiper blades 20 is turnably attached to a distal-end part of each of the wiper arms 16. Therefore, when a driver or the like operates a wiper switch (not shown), the wiper motor 14 is subjected to rotary drive, the pivot shafts 17 are subjected to swinging drive via the link mechanism 15, and the wiper arms 16 and the wiper blades 20 provided in the distal-end side thereof are subjected to swinging drive as a result.

Each of the wiper blades 20 operates reciprocating wiping for a wiping range 11a on the front glass 11 formed between an upper reversing position URP and a lower reversing position LRP by repeatedly moving in the directions of thick-line arrows FW and REV in the drawing by the rotary drive of the wiper motor 14. Then, the rainwater, etc. wiped off by the reciprocating wiping operation of the wiper blades 20 are collected in water reservoir parts P in the vicinities of the upper reversing positions URP and the lower reversing positions LRP, and the rainwater, etc. collected in the water reservoir part P flow down along the inclined surface of the front glass 11 and are discharged to outside of the vehicle 10.

The structure of wipe blade 20 is explained in detail with drawings. Since each wipe blade 20 of a driver's seat and a passenger's seat is formed in the same way, the wiper blade 20 of driver's seat is only explained here.

As shown in FIGS. 2 and 3, the wiper blade 20 is provided with a long rubber holder (holder) 21 turnably attached to the distal-end part of the wiper arm 16, and a blade rubber (blade) 22 attached to the rubber holder 21 so as to be along a longitudinal direction of the rubber holder 21 and is subjected to sliding contact while in elastic contact with the wipe surface of the front glass 11.

The rubber holder 21 is formed of, for example, flexible soft plastic and elastically deformable. An attachment tool 21a attached to a U-shaped hook (details not shown) formed at the distal-end part of the wiper arm 16 is provided at a substantially center part along the longitudinal direction of the rubber holder 21. The attachment tool 21a is provided with four swaging legs 21b, and each of the swaging legs 21b is fixed by swaging to a substantially center part along the longitudinal direction of a pair of vertebrae 21c (see FIG. 6) provided in the rubber holder 21. In other words, the rubber holder 21 is turnably attached to the U-shaped hook 16a at the distal-end part of the wiper arm 16 via the vertebrae 21c and the attachment tool 21a.

As shown in FIG. 6, longitudinal-direction both-end sides of the vertebrae 21c are coupled with a predetermined interval by a coupling tool 21d. Each of the vertebrae 21c is composed of an elastically-deformable plate-like steel material and formed into a curved shape having a curvature radius smaller than the curvature radius of the front glass 11. Therefore, the entire area of the blade rubber 22 along the longitudinal direction is pressured toward the front glass 11 by the elastic force of the vertebrae 21c with a predetermined pressure. As a result, the wipe surface of the front glass 11 can be uniformly and cleanly wiped.

As shown in FIG. 3, the blade rubber 22 is attached to the wipe-surface side of the rubber holder 21 along the longitudinal direction. In the wipe-surface side of the rubber holder 21, a blade attachment groove (not shown) is provided along the longitudinal direction. The blade rubber 22 is attached to the rubber holder 21 by inserting a main-body part 22a (see FIG. 6) of the blade rubber 22 from a first-end side of the longitudinal direction of the blade attachment groove toward a second-end side.

As shown in FIG. 2, in the side opposite to the wipe-surface side of the rubber holder 21, a fin part 21e is integrally provided along the longitudinal direction. The fin part 21e is provided to rise in a back-surface side along a short-side direction of the rubber holder 21, and a substantially arc-shaped inclined surface 21f is provided in a front-surface side of the fin part 21e. The fin part 21e is configured to generate downforce when the inclined surface 21f receives winds (travel winds) from the direction along the wipe surface of the front glass 11. When the fin part 21e generates downforce in this manner, the blade rubber 22 is pressed toward the wipe surface, and then, uplift of the wiper blade 20 is suppressed.

The blade rubber 22 is formed in a long shape by an elastic material such as rubber. As shown in FIG. 6, the blade rubber 22 is provided with: the main-body part 22a inserted in the blade attachment groove of the rubber holder 21, a lip part 22b brought into sliding contact with the wipe surface of the front glass 11 and wipes off rainwater, etc., and a neck part 22c connecting the main-body part 22a and the lip part 22b to each other.

The neck part 22c is thinner than the other part of the blade rubber 22, and the lip part 22b can be therefore tilted to the main-body part 22a as shown by broken lines in the drawing. The lip part 22b follows the moving direction of the wiper blade 20 and is tilted to a first side or a second side (left/right side in the drawing) as shown by a broken arrow S1 in the drawing. Then, occurrence of so-called chattering, etc. upon swinging drive of the wiper blade 20 is prevented.

As shown in FIGS. 2 to 7, caps 24 integrally provided with cover members 23 are attached to the longitudinal-direction both-end parts of the blade rubber 22. FIGS. 4 and 5 show the cover member 23 and the cap 24 provided in the swing center side of the blade rubber 22.

The cap 24 is formed of a resin material such as plastic into a bottomed shape having a closed first side and an opened second side, and the caps are configured to cover the longitudinal-direction both-end parts of the blade rubber 22 and the rubber holder 21. Therefore, fall-off (escape) of the blade rubber 22 from the rubber holder 21 is prevented, and the appearance of the both-end parts of the wiper blade 20 is improved.

The cap 24 is provided with: a cap main-body part 24a covering end parts of the rubber holder 21 and the blade rubber 22; a fin cover part 24b covering an end part of the fin part 21e; and a cover-member attachment part 24c disposed in the blade rubber 22 side and being subjected to attach the cover member 23.

The cover-member attachment part 24c is provided with: a cut-away part 24d for exposing the lip part 22b of the blade rubber 22 to the outside; a pair of engaging recessed parts 24e engaged with leg parts 23c of the cover member 23; and a positioning recessed part 24f engaged with a positioning projected part 23d of the cover member 23. When the cover member 23 is supported by the three locations, i.e., the engaging recessed parts 24e and the positioning recessed part 24f in this manner, they can be reliably fixed without misalignment.

In the state that the cover member 23 is fixed to the cap 24, the blade rubber 22 can be inserted to the blade attachment groove of the rubber holder 21 via the cut-away part 24d. Reversely, in the case of detachment of the blade rubber 22 for, for example, maintenance, the detachment is also carried out via the cut-away part 24d.

The cover member 23 is formed of a material different from that of the cap 24 and an elastic material such as rubber into a substantially U-shape. The cover member 23 is provided with: a cover main body 23b with an opening 23a and curved parts CU; the pair of leg parts 23c integrally provided with the cover main body 23b and engaged with the engaging recessed parts 24e of the cap 24; and the positioning projected part 23d integrally provided with the cover main body 23b and engaged with the positioning recessed part 24f of the cap 24.

The cover member 23 is attached to the cover-member attachment part 24c of the cap 24 and projects from the main-body part 22a side of the blade rubber 22 toward wipe surface side of the front glass 11. The opening 23a of the cover member 23 and the cut-away part 24d of the cap 24 are overlapped with each other as shown in FIG. 5, and the lip part 22b of the blade rubber 22 is therefore exposed to outside via the cut-away part 24d and the opening 23a.

As shown in FIG. 6, the thickness of the cover member 23 (cover main body 23b), that is, the projection height thereof from the cover-member attachment part 24c is set to a height h by which at least only the lip part 22b is exposed to outside when the blade rubber 22 is viewed from a lateral side. It means, the other parts (the main-body part 22a and the neck part 22c) excluding the lip part 22b of the blade rubber 22 are covered with the cover member 23. The height h is a height which the cover member 23 is close to the wipe surface of the front glass 11 as much as possible without bringing the cover member 23 into contact with the wipe surface of the front glass 11 when the lip part 22b is tilted in the manner shown in the broken-line arrow S1 in the drawing.

In this manner, the cover member 23 is partially covered the lateral parts of the blade rubber 22 from the three-direction sides, i.e., the front-surface side, the back-surface side, and the end-part side of the wiper blade 20. However, for example, the height may be set to the height that the neck part 22c is exposed to outside when the blade rubber 22 is viewed from the lateral side by removing the cover member 23 from the wipe surface of the front glass 11.

As shown in FIG. 5 and FIG. 6, tilting allowing gaps G are formed between the cover member 23 and the blade rubber 22. The tilting allowing gaps G avoids contact with the cover member 23 when the lip part 22b of the blade rubber 22 is tilted in the direction of the broken-line arrow S1 in the drawing. Then, the lip part 22b can be flexibly tilted without any restriction, and the wiping performance of the wiper blade 20 is ensured.

A pair of tapered parts T is provided on the cover member 23 in both the front-surface side and the back-surface side of the wiper blade 20, that is, in the side opposite to the blade rubber 22 side in the direction along the wipe surface of the front glass 11. Each of the tapered parts T is formed so that the thickness (height h) of the cover member 23 is gradually reduced as the tapered part gets away from the blade rubber 22. Then, even when the wiper blade 20 is tilted in the direction of a broken-line arrow S2 in the drawing, the contact between the cover member 23 and the wipe surface of the front glass 11 can be avoided. That is, the tapered parts T allow tilting of the wiper blade 20 and ensure wiping performance of the wiper blade 20.

To attach the cover member 23 to the cap 24, first, as shown in FIG. 7, the positioning projected part 23d of the cover member 23 is engaged with the positioning recessed part 24f of the cap 24. Then, the cover main body 23b of the cover member 23 is elastically deformed in the directions of broken-line arrows M in the drawing, for example, by holding the cover main body 23b of the cover member 23, and, at the same time, the leg parts 23c of the cover member 23 are engaged with the engaging recessed parts 24e of the cap 24, respectively. As a result, the cover member 23 is completely attaches to the cap 24.

The operation of the wiper blade 20 of the first embodiment is explained in detail with FIG. 8 showing fluid analysis (CAE analysis).

The state shown in FIG. 8 shows a state that the wiper blade 20 is at the upper reversing position URP, specifically, a state that the longitudinal direction of the wiper blade 20 and the front-back direction of the vehicle 10 are shifted by 20° to 30°. When the vehicle 10 travels at high speed in this state, the wiper blade 20 receives a travel wind W from the direction shifted from a reference line C by 20° to 30°. At this point, the travel wind W flows by branching into that of the fin part 21e side of the rubber holder 21 and that of the blade rubber 22 side.

The travel wind W flowing to the fin part 21e side collides with the inclined surface 21f (see FIG. 2) of the fin part 21e from the front-surface side, thereby generating downforce at the wiper blade 20 and suppressing uplift of the wiper blade 20 from the front glass 11. Then, the travel wind W flowing to the fin part 21e side is guided to the back-surface side of the wiper blade 20 and swirls are generated in the back-surface side of the wiper blade 20.

On the other hand, as shown by a solid-line arrow F1 in FIG. 4, most of the travel wind W flowing to the blade rubber 22 side flows along the curved part CU of the cover member 23 attached to the cap 24 and then flows along the longitudinal direction of the wiper blade 20 in the back-surface side of the wiper blade 20. Therefore, the travel wind W flowing along the curved part CU of the cover member 23 collides with the swirls generated by the fin part 21e and reduces or extinguishes the swirls to regulate the flow. As shown in FIG. 8, in the present embodiment, the range of the generating location (deep-color hatched part in the drawing) of large negative pressures can be reduced in the back-surface side of the wiper blade 20 by suppressing generation of swirls (negative pressure).

Figure 9:
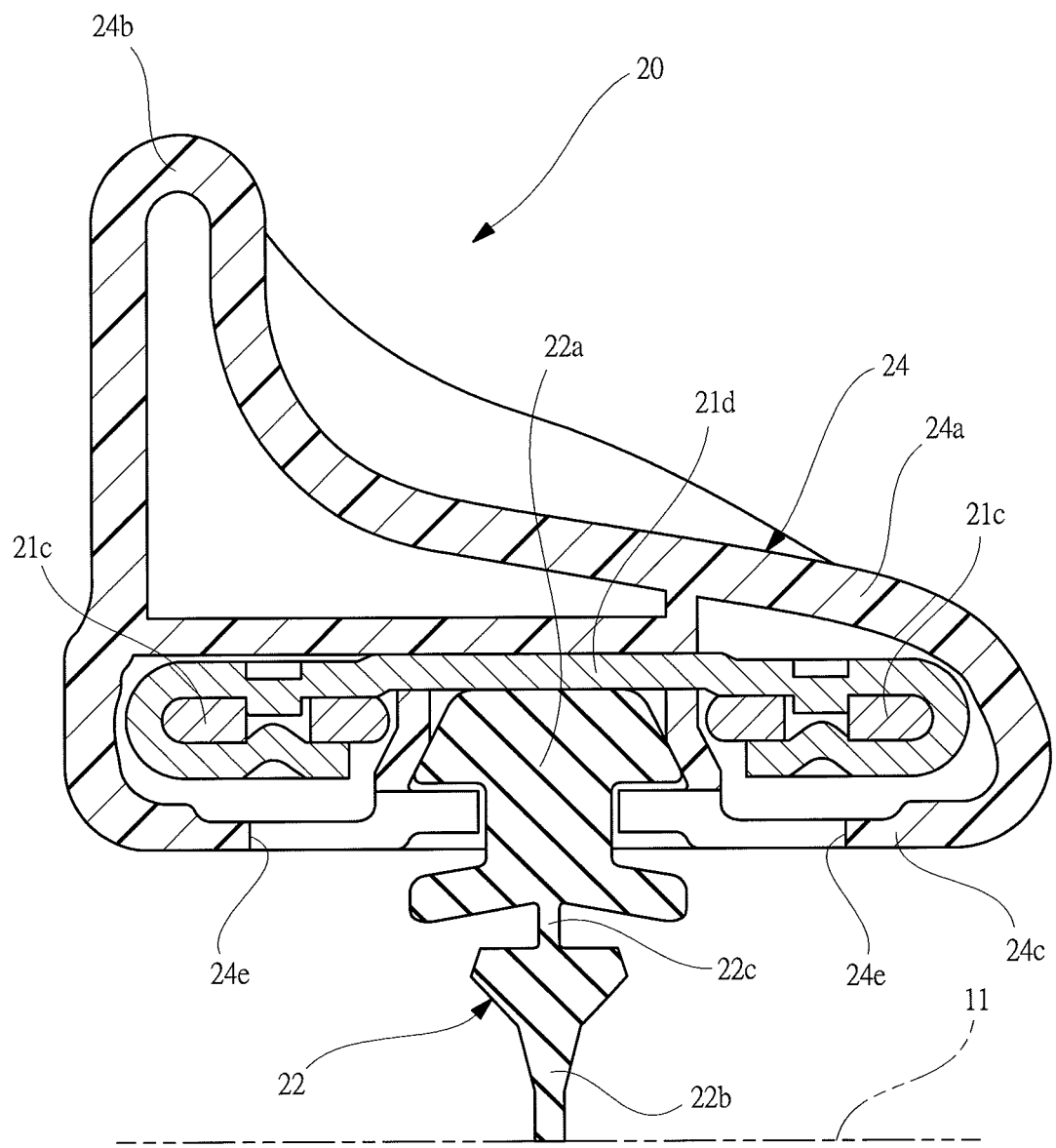
FIG. 9 is a perspective view corresponding to FIG. 6 showing a wiper blade of comparative example without covering members.
Figure 10:
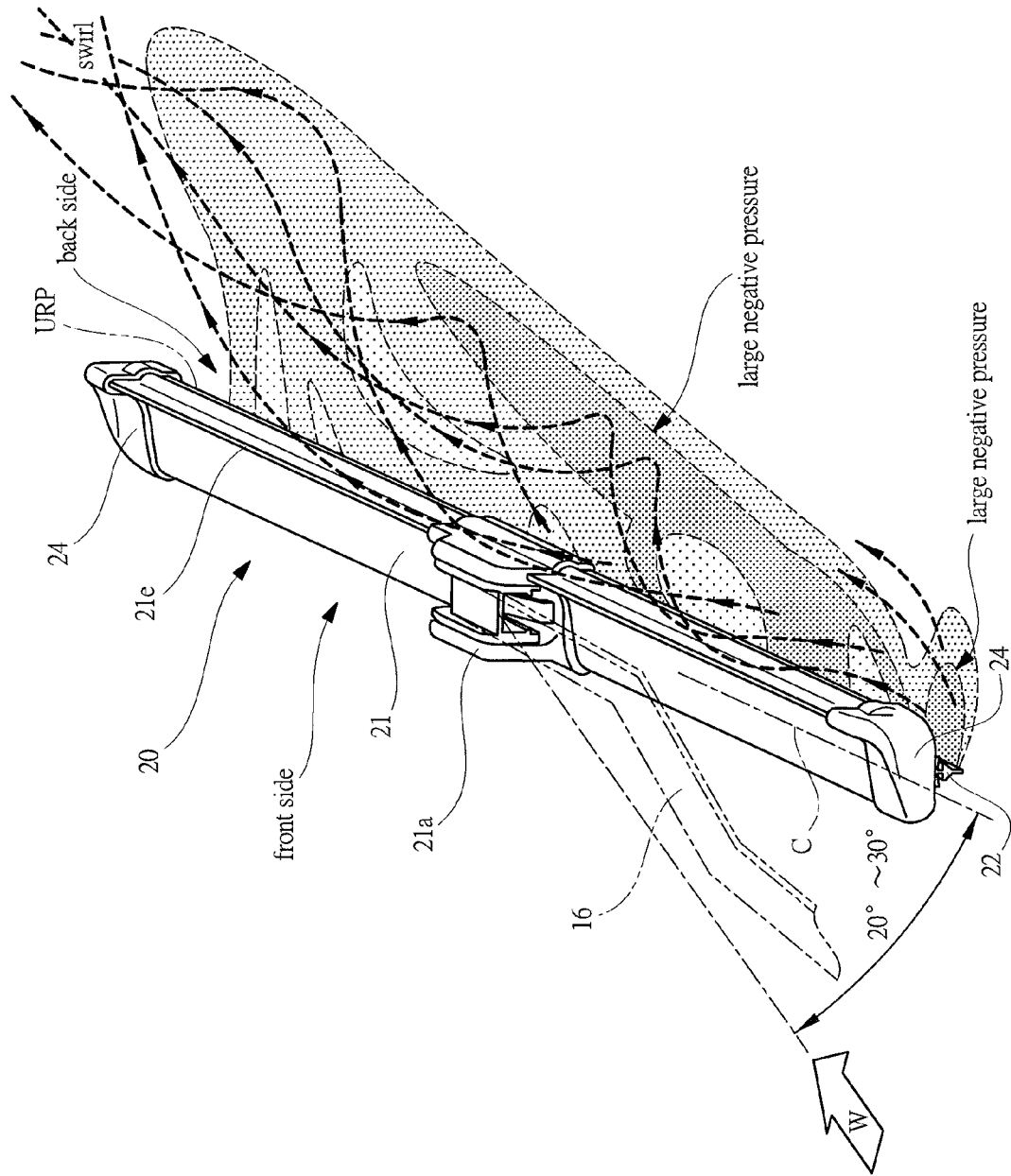
FIG. 10 is an analysis figure explaining the occurrence of a negative pressure in the wiper blade of FIG. 9.

The wiper blade 20 without cover member 23 (comparative example) is explained in detail with FIGS. 9 and 10. FIG. 9 shows a perspective view corresponding to FIG. 6 showing a wiper blade of comparative example without covering members. FIG. 10 shows an analysis figure explaining the occurrence of a negative pressure in the wiper blade of FIG. 9.

As shown in FIG. 9, a cap 24 in a wiper blade 20 of a comparative example is not provided with the cover member 23. Therefore, as shown by arrows F2 of two-dot-chain lines in FIG. 4, the travel wind W flowing to the blade rubber 22 side flows at once from the front-surface side of the blade rubber 22 to the back-surface side of the blade rubber 22. In this process, swirls are generated in the back-surface side of the blade rubber 22. The travel wind W, different from the wiper blade 20 provided with the cover member 23 (present invention), does not easily flow along the longitudinal direction in the back-surface side of the wiper blade 20.

As a result, in the comparative example not provided with the cover member 23, it is difficult to suppress generation of swirls in the back-surface side of the wiper blade 20. That is, FIG. 10 shows, that the range of the generation location of large negative pressures (deep-color hatched part in the drawing) is expanded in the back-surface side of the wiper blade 20 compared with FIG. 8 (present invention). This means that rainwater, etc. can be easily drawn into the wiping range 11a of the front glass 11 (water draw-in phenomenon easily occurs).

As described above, according to the wiper blade 20 of the first embodiment, the fin part 21e pressing the blade rubber 22 toward the wipe surface by receiving the travel wind W from the direction along the wipe surface is provided in the side opposite to the wipe-surface side of the rubber holder 21, and the cover members 23 partially covering the lateral parts of the blade rubber 22 by projecting to the wipe-surface side are provided at the longitudinal-direction both-end parts of the blade rubber 22. Therefore, uplift of the wiper blade 20 can be suppressed by the fin part 21e. Moreover, at the end part of the swing center side of the blade rubber 22, the flow of the travel wind W flowing from the front-surface side thereof to the back-surface side can be regulated by the cover member 23, and the travel wind W can be caused to flow along the longitudinal direction in the back-surface side of the wiper blade 20. Therefore, generation of the swirls generated in the back-surface side of the wiper blade 20 can be reduced to suppress occurrence of the water draw-in phenomenon, and rainwater, etc. can be wiped off well as a result without leaving the rainwater, etc. on the wipe surface.

According to the wiper blade 20 of the first embodiment, the height h of the cover member 23 is the height h that the part at least excluding the lip part 22b of the blade rubber 22 is covered. Therefore, the cover member 23 can be close to the wipe surface without contacting the wipe surface, the flow-regulating effect by the cover member 23 can be further enhanced, and generation of the water draw-in phenomenon can be further suppressed.

Furthermore, according to the wiper blade 20 of the first embodiment, the tilting allowing gaps G allowing tilting of the lip part 22b of the blade rubber 22, are provided between the cover member 23 and the blade rubber 22. Therefore, upon wiping operation of the wiper blade 20, the lip part 22b of the blade rubber 22 can be precisely tilted, and occurrence of wiping unevenness (reduction in wiping performance) can be suppressed.

According to the wiper blade 20 of the first embodiment, the tapered parts T allowing tilting of the wiper blade 20, are provided in the side opposite to the blade rubber 22 side in the direction along the wipe surface of the cover member 23. Therefore, when the wiper blade 20 is tilted upon wiping operation of the wiper blade 20, the cover member 23 can be prevented from contacting the wipe surface, and occurrence of wiping unevenness, etc. (reduction in wiping performance) can be suppressed.

Furthermore, according to the wiper blade 20 of the first embodiment, the caps 24 are provided at the end parts of the blade rubber 22, and the cover members 23 are integrally provided with the caps 24, respectively. Therefore, the end parts of the blade rubber 22 can be prevented from being exposed outside, and appearance of the wiper blade 20 can be improved.

According to the wiper blade 20 of the first embodiment, the cap 24 is formed of a plastic material, and the cover member 23 is formed of a rubber material. Therefore, in case that the cover member 23 collides with the front glass 11, for example, the wiper blade 20 is swiftly returned after the wiper blade 20 is brought into a lock-back state (uprise state) when the vehicle 10 is washed, the shock caused by the collision between the wiper blade 20 and the front glass 11 can be reduced. In this process, the cover member 23 partially covers the lateral parts of the blade rubber 22; therefore, unmanageable external force can be prevented from being applied to the blade rubber 22.

A wiper blade 30 of the second embodiment is explained in detail with drawings. A part having a same function as the above-mentioned first embodiment marks the same reference and the explanation thereof is abbreviated.

Figure 11:
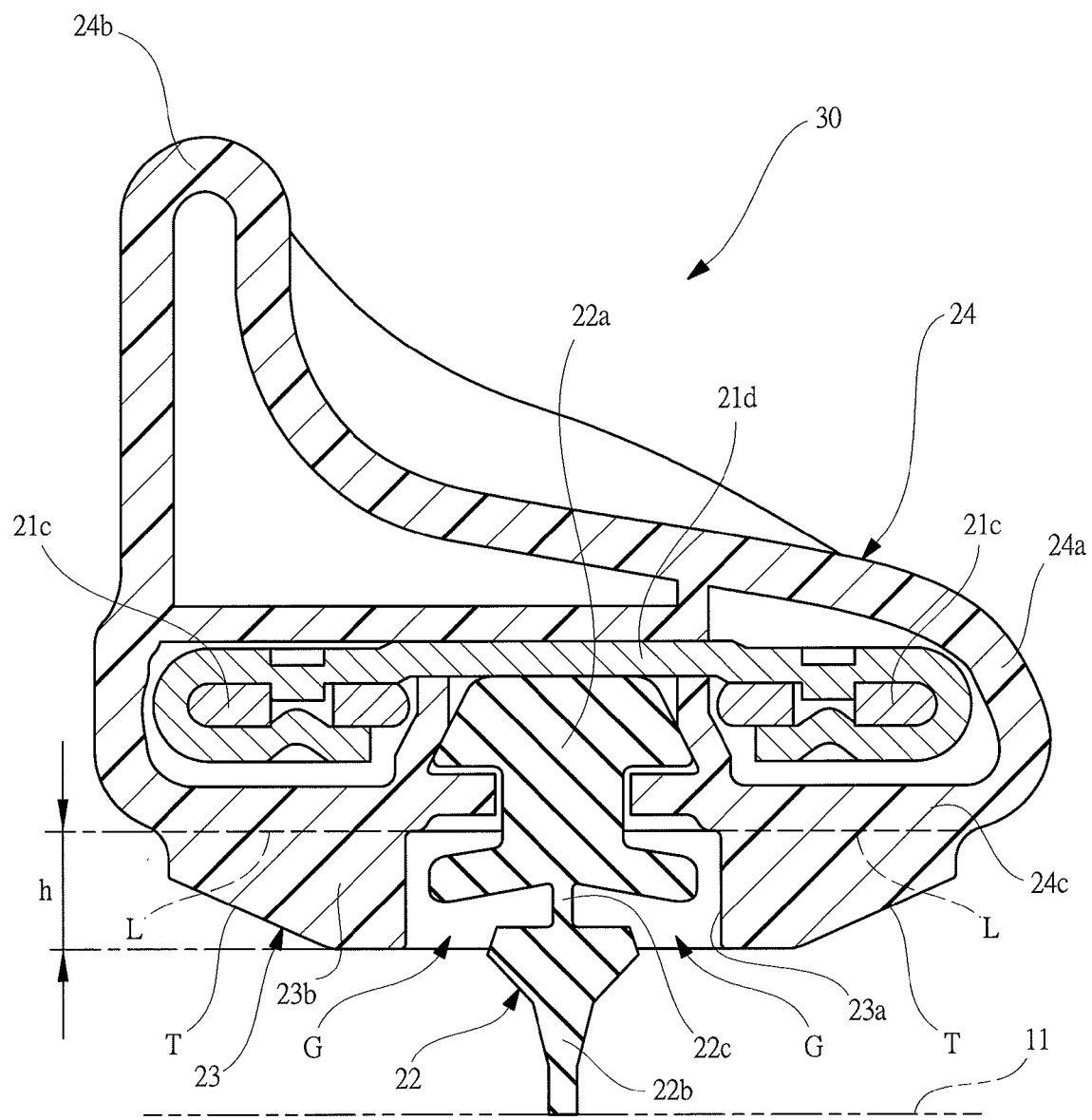
FIG. 11 is a perspective view corresponding to FIG. 6 showing a wiper blade of the second embodiment.

FIG. 11 shows a perspective view corresponding to FIG. 6 showing a wiper blade of the second embodiment.

As shown in FIG. 11, a wiper blade 30 of a second embodiment is same as the wiper blade 20 of the first embodiment except the cap 24 and the cover member 23 are integrally molded with a resin material such as plastic.

Effect of wiper blade 30 of the second embodiment formed above is substantially the same as those of the above-mentioned first embodiment. Additionally, in the second embodiment, the caps 24 and the cover member 23 are integrally molded and therefore, an assembly step (sub assembly) for fixing them each does not need, and an assembly step of the wiper blade 30 can be simplified.

The present invention is not limited to the above described embodiments, and needless to say, various modifications can be made without departing from the gist thereof. For example, the above described embodiments show the examples that the cover members 23 are integrally provided with the caps 24; however, the present invention is not limited to that, and the cover members may be integrally provided with the longitudinal-direction both-end parts of the rubber holder 21.

The above described embodiments show the examples that the cover members 23 are provided at the longitudinal-direction both-end parts of the blade rubber 22, respectively. However, the present invention is not limited to that, and the cover member 23 may be provided only in the swing center side of the blade rubber 22.

Furthermore, the above described embodiments show the examples that each of the cover members 23 has a bilaterally symmetric shape as shown in FIG. 7B, and the cover members can be disposed at the longitudinal-direction both-end parts of the blade rubber 22, respectively. However, the present invention is not limited to that, but may employ a shape in which either one of the left/right sides of the cover member 23 shown in FIG. 7B is omitted, that is, only the member in the back-surface side of the wiper blade 20 remains while omitting the front-surface side of the wiper blade 20.

The above described second embodiment shows the example that the caps 24 and the cover members 23 are integrally molded by using the same material (plastic material). However, the present invention is not limited to that. As well as the above described first embodiment, while using a plastic material for the cap 24 and a rubber material for the cover member 23, they may be integrated by a border line L shown in FIG. 11 by two-color molding so that the cover members 23 are integrally formed with the caps 24.

Furthermore, the above described embodiments show the examples that the rubber holder 21 is formed to have a long shape, wherein the fin part 21e is integrally provided with the rubber holder 21. However the present invention is not limited to that. The fin part may be integrally provided with the long blade rubber, and the blade rubber may be retained by using a short rubber holder at a substantially center part along the longitudinal direction of the blade rubber (for example, see a shape described in JP Publication No. 2007-176459). In that case, the cover members can be integrally provided with the end parts of the blade rubber.

The above described embodiments show the examples that the wiper blade is applied to the wiper device mounted on the vehicle 10 such as an automobile. However, the present invention is not limited to that, but can be applied also to wiper devices of, for example, railway vehicles and airplanes used under high-speed conditions.

The wiper blade is used for operating reciprocating wiping on a windshield by rotary drive of a wiper motor provided in a vehicle such as an automobile and improving the range of view of, for example, a driver.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper blade for wiping a windshield of a vehicle, wherein the wiper blade is attached to a distal-end part of a wiper arm which is subjected to swinging drive by a drive source, the wiper blade comprising:
    a blade rubber formed into a long shape, the blade rubber having a lip part brought into sliding contact with the windshield, a main-body part integral with the lip part, and a neck part connecting the lip part to the main-body part;
    a rubber holder formed into a long shape, attached to the distal-end part of the wiper arm, and adapted to hold the main-body part of the blade rubber, the rubber holder having a fin part pressing the blade rubber toward the windshield when a wind flows along the windshield while the vehicle is moving;
    a pair of caps which are respectively attached to longitudinal end parts of the blade holder; and
    a cover member provided to a bottom part of at least one of the caps, wherein the cover member has three portions which respectively correspond to a front side, a rear side, and an end side of the blade rubber, and which protrude toward the windshield so as to continuously cover the main-body part, the neck part, and one end portion of the front side, the rear side, and the end side of the blade rubber while exposing only the lip part of the blade rubber to the outside, wherein the main-body part and the neck part are covered by the cover member, leaving only the remaining lip part exposed.

2. The wiper blade according to claim 1, wherein the caps are adapted to cover respective end parts of the rubber holder and respective end parts of the blade rubber, and adapted to prevent the blade rubber from falling away from the rubber holder, wherein the cover member is attached to one of the caps, which is close to the wiper arm in comparison with the other of the caps.

3. The wiper blade according to claim 2, wherein the caps are made of plastic, the cover member is made of rubber, and the cap and the cover member are integrally formed by two color molding.

4. The wiper blade according to claim 1, wherein a tilting allowing gap is formed between the cover member and the blade rubber and allows the lip part of the blade rubber to be tilted in a moving direction of the blade rubber.

5. The wiper blade according to claim 1, wherein the cover member is formed with a taper part which is gradually reduced in thickness in a direction away from the blade rubber.

6. The wiper blade according to claim 1, wherein the cover member has curved parts on the same side as a distal end of the wiper blade,
- the curved parts have a regulating function causing a wind flowing along the curved parts of the cover member to collide with swirls generated by the fin part so as to reduce or extinguish the swirls.

\* \* \* \* \*